(12) United States Patent
Kameyama et al.

(10) Patent No.: US 11,009,120 B2
(45) Date of Patent: May 18, 2021

(54) SHIFT DEVICE

(71) Applicant: KABUSHIKI KAISHA TOKAI-RIKA-DENKI-SEISAKUSHO, Aichi-ken (JP)

(72) Inventors: Keisuke Kameyama, Aichi-ken (JP); Kenji Nakanishi, Aichi-ken (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 8 days.

(21) Appl. No.: 16/668,071

(22) Filed: Oct. 30, 2019

(65) Prior Publication Data
US 2020/0149625 A1 May 14, 2020

(30) Foreign Application Priority Data
Nov. 9, 2018 (JP) .............................. JP2018-211566

(51) Int. Cl.
F16H 59/02 (2006.01)
F16H 59/10 (2006.01)
F16H 63/42 (2006.01)

(52) U.S. Cl.
CPC ....... F16H 59/0278 (2013.01); F16H 59/105 (2013.01); F16H 63/42 (2013.01)

(58) Field of Classification Search
CPC ..... F16H 59/0278; F16H 59/105; F16H 63/42
See application file for complete search history.

(56) References Cited

U.S. PATENT DOCUMENTS

| | | | |
|---|---|---|---|
| 2015/0314725 A1* | 11/2015 | Salter | B60Q 3/80 362/510 |
| 2016/0131247 A1* | 5/2016 | Kim | B60K 35/00 74/473.3 |
| 2017/0108116 A1* | 4/2017 | Kim | F16H 59/105 |
| 2017/0146115 A1* | 5/2017 | Haller | F16H 61/24 |
| 2017/0152938 A1* | 6/2017 | Kirilenko | F16H 59/105 |
| 2018/0274664 A1* | 9/2018 | Corkins | F16H 59/105 |
| 2018/0364072 A1* | 12/2018 | Kirilenko | F16H 59/044 |
| 2019/0113132 A1* | 4/2019 | Woo | F16H 59/0278 |
| 2019/0128404 A1* | 5/2019 | Morales | F16H 59/105 |
| 2019/0195342 A1* | 6/2019 | Beattie | F16H 59/08 |
| 2019/0203826 A1* | 7/2019 | Jiran | F16H 61/32 |
| 2019/0219150 A1* | 7/2019 | Kanatani | F16H 59/0278 |
| 2019/0353241 A1* | 11/2019 | Kim | F16H 59/08 |
| 2019/0368599 A1* | 12/2019 | Guevara | F16H 59/02 |
| 2019/0375392 A1* | 12/2019 | Rake | F16H 59/08 |
| 2019/0376815 A1* | 12/2019 | Pfeifer | F16H 59/105 |
| 2019/0383386 A1* | 12/2019 | Harris | F16H 63/42 |
| 2020/0096307 A1* | 3/2020 | Fukumoto | G05G 1/015 |
| 2020/0149625 A1* | 5/2020 | Kameyama | F16H 59/0278 |

(Continued)

FOREIGN PATENT DOCUMENTS

JP 2011-65468 A 3/2011

Primary Examiner — David M Fenstermacher
(74) Attorney, Agent, or Firm — Roberts Calderon Safran & Cole P.C.

(57) ABSTRACT

In a shift device, a lever is able to slide in a front-rear direction relative to a housing, and an FFC electrically connects a sensor substrate of the housing to an operating substrate of the lever. Here, the lever is moved slidingly in the front-rear direction, which is on a perpendicular direction side relative to a width direction of the FFC. Because of this, a reduction in the durability of the FFC can be inhibited.

10 Claims, 6 Drawing Sheets

(56) References Cited

U.S. PATENT DOCUMENTS

| | | | |
|---|---|---|---|
| 2020/0309252 A1* | 10/2020 | Jiran | F16H 59/0204 |
| 2020/0309253 A1* | 10/2020 | Fribus | F16H 59/08 |
| 2020/0343891 A1* | 10/2020 | Vollkommer | F16H 59/12 |
| 2020/0355520 A1* | 11/2020 | Bao | F16H 63/40 |
| 2020/0386306 A1* | 12/2020 | Ypma | F16H 61/12 |

* cited by examiner

SHIFT DEVICE

CROSS-REFERENCE TO RELATED APPLICATION

This application is based on and claims priority under 35 USC 119 from Japanese Patent Application No. 2018-211566 filed on Nov. 9, 2018, the disclosure of which is incorporated by reference herein.

BACKGROUND

Technical Field

The present invention relates to a shift device in which a shift position is altered as a result of a shift body being moved.

Related Art

In an operating device described in Japanese Unexamined Patent Application (JP-A) No. 2011-65468, a select ECU is provided at a vehicle body side, and a display driver is provided at a select lever. A harness electrically connects the select ECU to the display driver.

In this operating device, a display unit and a backlight are provided at the select lever, and an FPC, which is flexible, electrically connects the display unit and backlight to the display driver at the select lever.

SUMMARY

The present invention was conceived in view of the above-described circumstances, and it is an object thereof to provide a shift device that, when a connecting board electrically connects a first electrical mechanism at vehicle body side to a second electrical mechanism of a shift body, enables any decrease in the durability of the connecting board to be inhibited.

A shift device according to a first aspect of the present invention comprises a first electrical mechanism which is provided at a vehicle body side; a shift body that is movable via a sliding or pivoting motion in a predetermined direction relative to the first electrical mechanism and that, as a result of being moved, causes a shift position to be altered; a second electrical mechanism which is provided at the shift body; and a connecting board that is flexible, and that extends between the first electrical mechanism and the second electrical mechanism so as to electrically connect the first electrical mechanism and the second electrical mechanism together, the shift body moving only towards a perpendicular direction side relative to an extension width direction of the connecting board.

In the shift device of the first aspect of the present invention, the first electrical mechanism is provided at the vehicle body side, and the shift body is movable via the sliding or pivoting motion in the predetermined direction relative to the first electrical mechanism. The shift position is altered as the result of the shift body being moved. In addition, the second electrical mechanism is provided at the shift body, and the connecting board that is flexible extends between the first electrical mechanism and the second electrical mechanism so as to electrically connect the first electrical mechanism and the second electrical mechanism together.

Here, the shift body is only moved to the perpendicular direction side relative to the extension width direction of the connecting board. Because of this, any decrease in the durability of the connecting board can be inhibited.

A shift device of a second aspect of the present invention is characterized in that, in the shift device of the first aspect of the present invention, the connecting board is connected to at least one of the first electrical mechanism or the second electrical mechanism from an underside thereof.

In the shift device of the second aspect of the present invention, the connecting board is connected to at least one of the first electrical mechanism or the second electrical mechanism from the underside thereof. Because of this, liquids can be inhibited from penetrating at least one of the connecting portions between the connecting board and the first electrical mechanism or the second electrical mechanism.

A shift device of a third aspect of the present invention is characterized in that, in the shift device of the first aspect or second aspect of the present invention, a discharge aperture through which the connecting board is discharged to a first electrical mechanism side is provided at the shift body.

In the shift device of the third aspect of the present invention, the connecting board is discharged from the discharge aperture in the shift body to the first electrical mechanism side. Because of this, the connecting board can be easily connected to the first electrical mechanism.

A shift device of a fourth aspect of the present invention is characterized in that, in the shift device of any one of the first through third aspects of the present invention, there is provided a contact portion that is contacted by the connecting board when the connecting board is bent, and that causes a curvature of the connecting board to be reduced.

In the shift device of the fourth aspect of the present invention, when the connecting board is in a bent state, the connecting board is placed in contact with the contact portion so that the curvature of the connecting board is reduced. Because of this, it is possible to inhibit the curvature of the connecting board from becoming too large when the shift body is moved.

The shift device of the fifth aspect of the present invention is characterized in that, in the shift device of the fourth aspect of the present invention, when the shift body is moved, a sliding motion of the connecting board relative to the contact portion is restricted.

In the shift device of the fifth aspect of the present invention, when the shift body is moved, the sliding motion of the connecting board relative to the contact portion is restricted. Because of this, movement of the connecting board in portions peripheral to the contact portion is inhibited.

A shift device of a sixth aspect of the present invention is characterized in that, in the shift device of any one of the first through fifth aspects of the present invention, an insertion through hole, through which the connecting board is inserted, is provided at the shift body so as to extend.

In the shift device of the sixth aspect of the present invention, the insertion through hole is provided at the shift body so as to extend, and the connecting board is inserted through the insertion through hole. Because of this, when the shift body is moved, movement of the connecting board within the shift body is inhibited.

A shift device of a seventh aspect of the present invention is characterized in that, in the shift device of any one of the first through sixth aspects of the present invention, the connecting board is disposed at a portion on one side in the predetermined direction of the shift body, and the shift body is moved to the one side in the predetermined direction so as to be moved to a side of a connecting portion between the first electrical mechanism and the connecting board.

In the shift device of the seventh aspect of the present invention, the connecting board is disposed at the portion on one side in the predetermined direction of the shift body, and the shift body is moved to the one side in the predetermined direction so as to be moved to the side of the connecting portion between the first electrical mechanism and the connecting board. Because of this, when the shift body has moved to the one side in the predetermined direction, the connecting board is connected to the first electrical mechanism thereby enabling the connecting board to be easily connected to the first electrical mechanism.

BRIEF DESCRIPTION OF THE DRAWINGS

Exemplary embodiments of the present invention will be described in detail based on the following figures, wherein.

DETAILED DESCRIPTION

Figure 1:
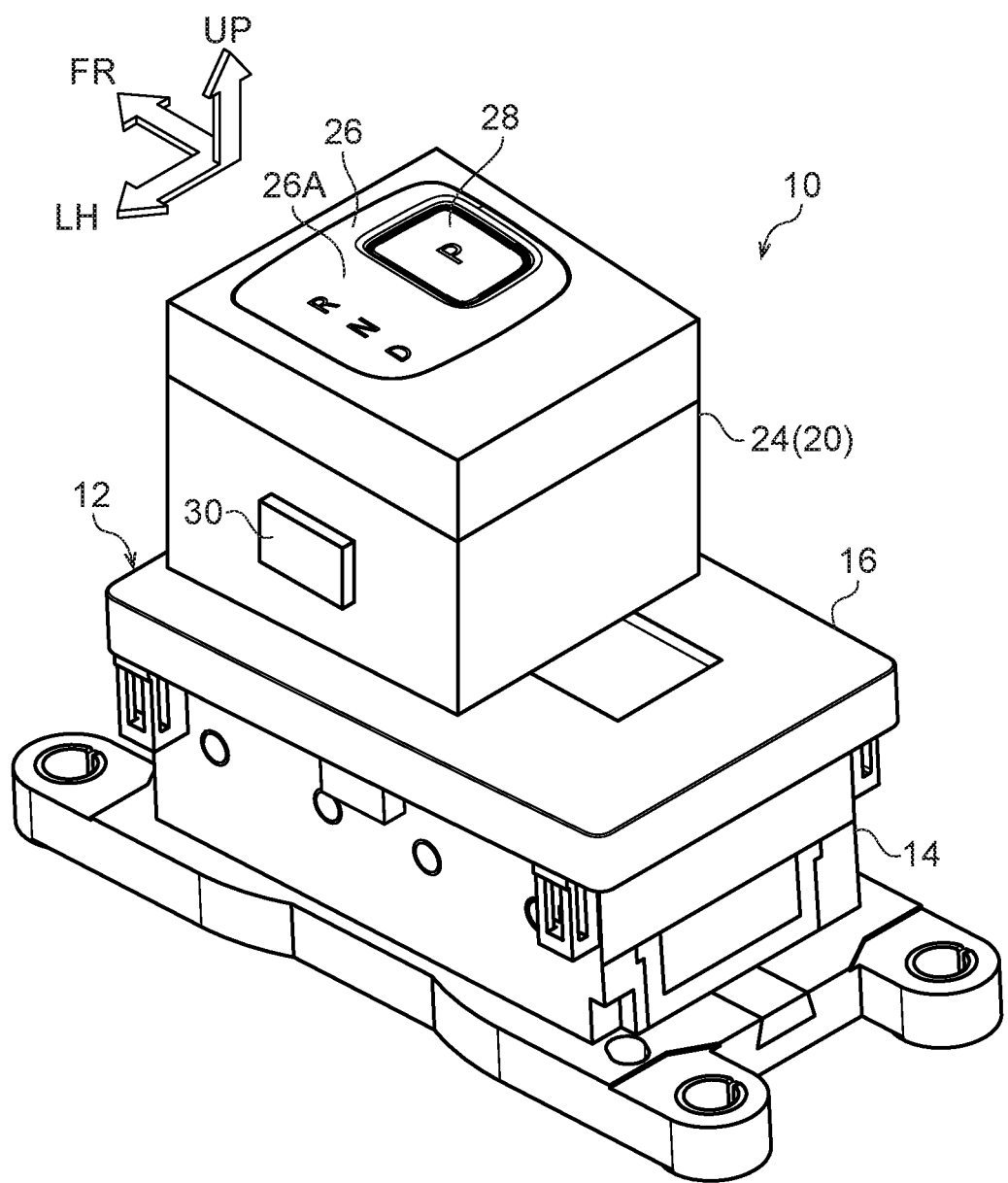
FIG. 1 is a perspective view looking from a diagonally rear-left direction showing a shift device according to an exemplary embodiment of the present invention.

A shift device 10 according to an exemplary embodiment of the present invention is shown in FIG. 1 in a perspective view looking from a diagonally rear-left direction. Furthermore, the shift device 10 is shown in an exploded perspective view looking from a diagonally rear-left direction in FIG. 2, and the shift device 10 is shown in a cross-sectional view looking from the left side in FIG. 3. Note that an arrow FR, an arrow LH, and an arrow UP that are shown in the appropriate drawings respectively indicate a shift device 10 forward direction, a shift device 10 left-side direction, and a shift device 10 upward direction.

The shift device 10 according to the present exemplary embodiment is disposed in a central portion in a vehicle width direction of a floor portion of a vehicle cabin of a vehicle (i.e., an automobile), and the front side, left side, and upper side of the shift device 10 respectively face towards the front side, left side, and upper side of the vehicle.

Figure 2:
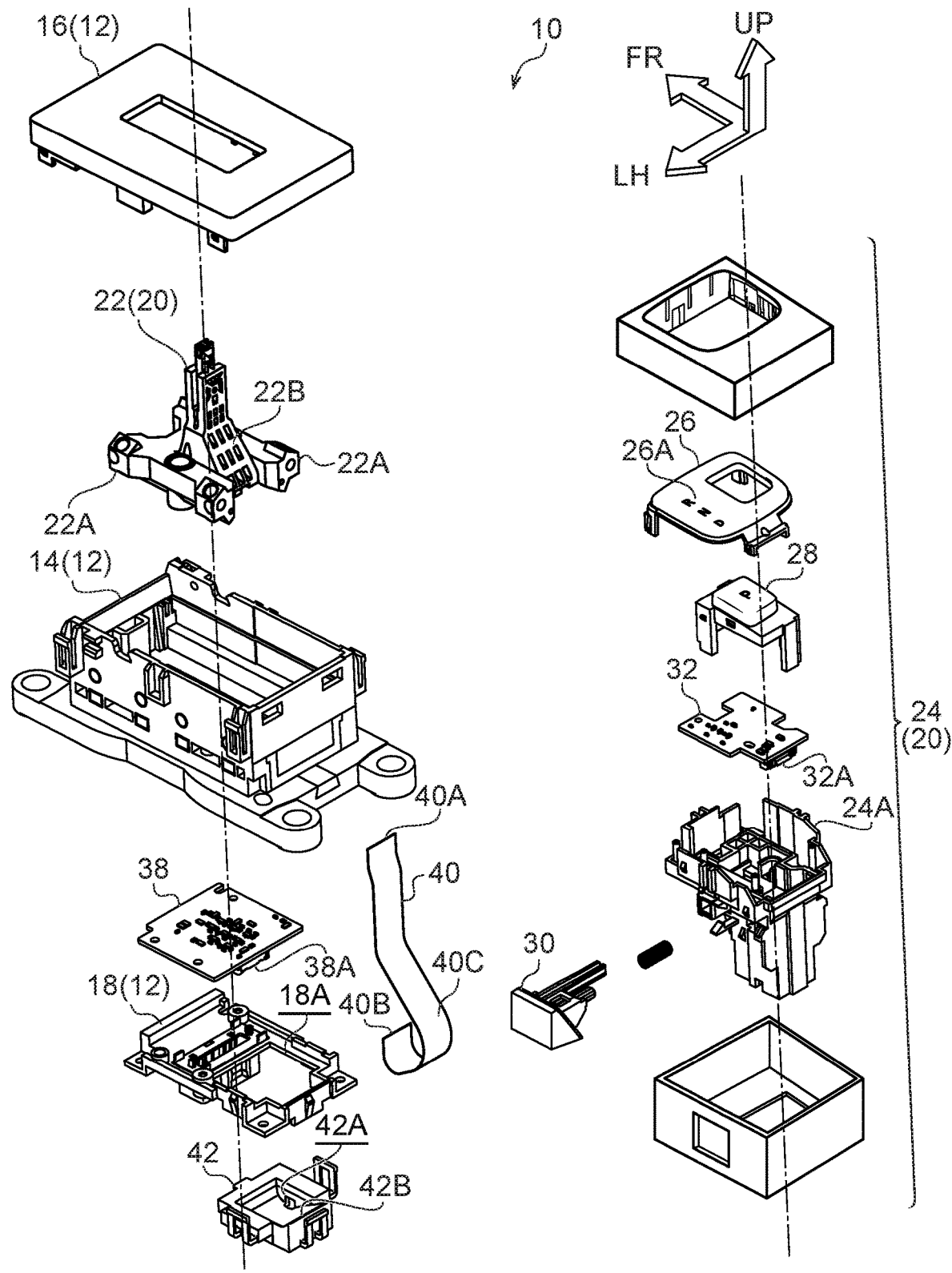
FIG. 2 is an exploded perspective view looking from a diagonally rear-left direction showing the shift device according to the exemplary embodiment of the present invention.
Figure 3:
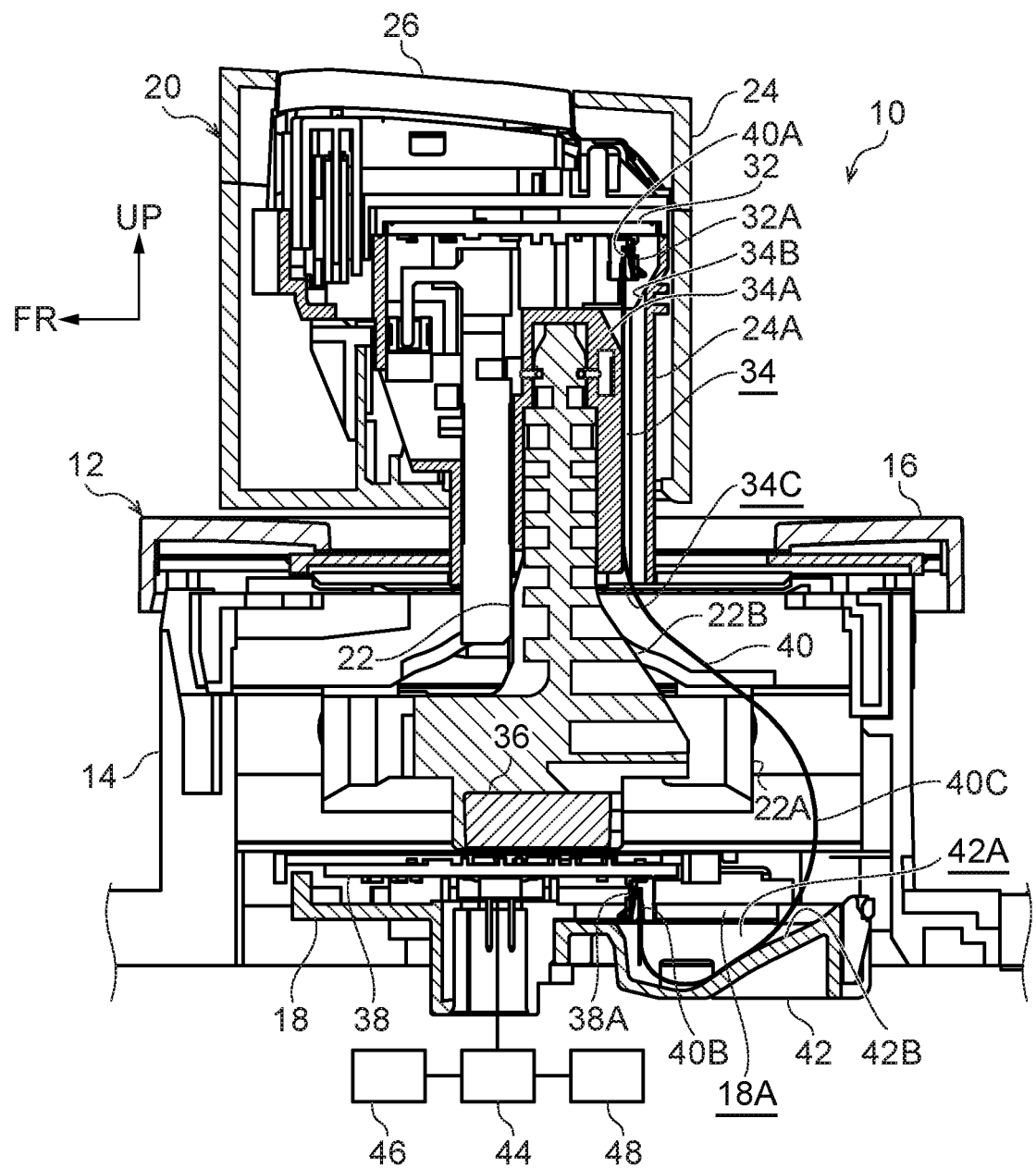
FIG. 3 is a cross-sectional view looking from the left side showing the shift device according to the exemplary embodiment of the present invention.

As is shown in FIG. 1 through FIG. 3, a substantially rectangular parallelepiped-box shaped housing 12 which is made from resin and serves as a supporting body (on the vehicle-body side) is provided in the shift device 10. A substantially rectangular-cylinder shaped base plate 14 which serves as a supporting component is provided in an intermediate portion in an up-down direction of the housing 12. The base plate 14 is installed on (i.e., fixed to) the floor portion of the vehicle cabin, and an interior portion of the base plate 14 is open on both an upper side and a lower side thereof.

A substantially rectangular parallelepiped-box shaped housing gate 16 (i.e., a cover) which serves as a covering component is provided in an upper portion of the housing 12, and an interior of the housing gate 16 is open on a lower side thereof. The housing gate 16 is fixed to an upper side of the base plate 14 so that the housing gate 16 covers the interior of the base plate 14 from the upper side. A substantially rectangular-plate shaped sensor case 18 which serves as a bottom component is provided in a lower portion of the housing 12, while a substantially rectangular open hole 18A is formed penetrating a rear-side portion of the sensor case 18. The sensor case 18 is fixed to the lower portion of the interior of the base plate 14 so that the sensor case 18 covers the interior of the base plate 14 from the lower side thereof.

A substantially column-shaped lever 20 which serves as a shift body is supported within the base plate 14 interior, and this lever 20 extends in the up-down direction.

A lever main body 22 which is made from resin and serves as a main body portion is provided in a lower-side portion of the lever 20. Substantially rectangular-column shaped slides 22A are provided integrally with both a left side and a right side of a lower end portion of the lever main body 22. The slides 22A protrude outwards in a left-right direction of the lever main body 22, and also extend in the front-rear direction. The pair of slides 22A are supported within the base plate 14 interior so as to be able to move slidingly in the front-rear direction. The pair of slides 22A are moved slidingly in the front-rear direction and the lever 20 is able to move slidingly in the front-rear direction (i.e., in a predetermined direction) within a predetermined range. The movement of the pair of slides 22A in the up-down direction and left-right direction is restricted within the base plate 14 interior, and the angles that the pair of slides 22A are able to rotate around the up-down direction of the lever 20 (i.e., around the axial direction thereof) are set respectively, for example, to 5° on both sides in a circumferential direction.

A planar mounting surface 22B which serves as a mounting portion is formed on a rear surface of a lower portion of the lever main body 22. The mounting surface 22B is inclined so as slope downwards as it approaches the rearward side, and a lower portion thereof is disposed between the pair of slides 22A.

A substantially rectangular-parallelepiped shaped knob 24 which serves as a gripping portion is provided on an upper-side portion of the lever 20. A substantially rectangular-frame shaped knob body 24A that is made of resin is provided within the knob interior, and this knob body 24A protrudes towards the lower side. The knob body 24A is fixed to an upper portion of the lever main body 22 and, as a result of this, the knob 24 is fixed to the upper portion of the lever main body 22.

Figure 4:
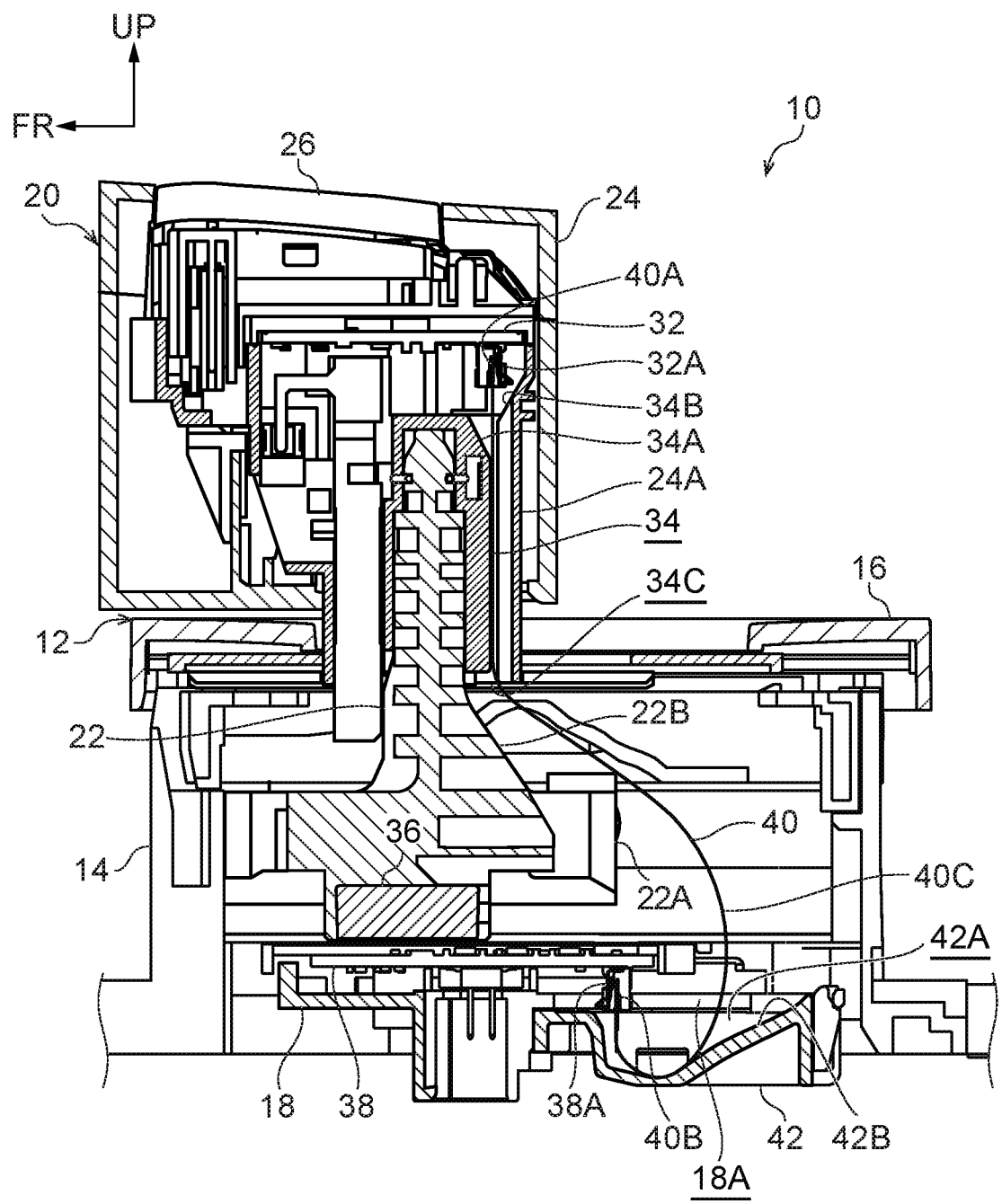
FIG. 4 is a cross-sectional view looking from the left side showing a state when a lever is moved slidingly from 'N' to 'R' in the shift device according to the exemplary embodiment of the present invention.
Figure 5:
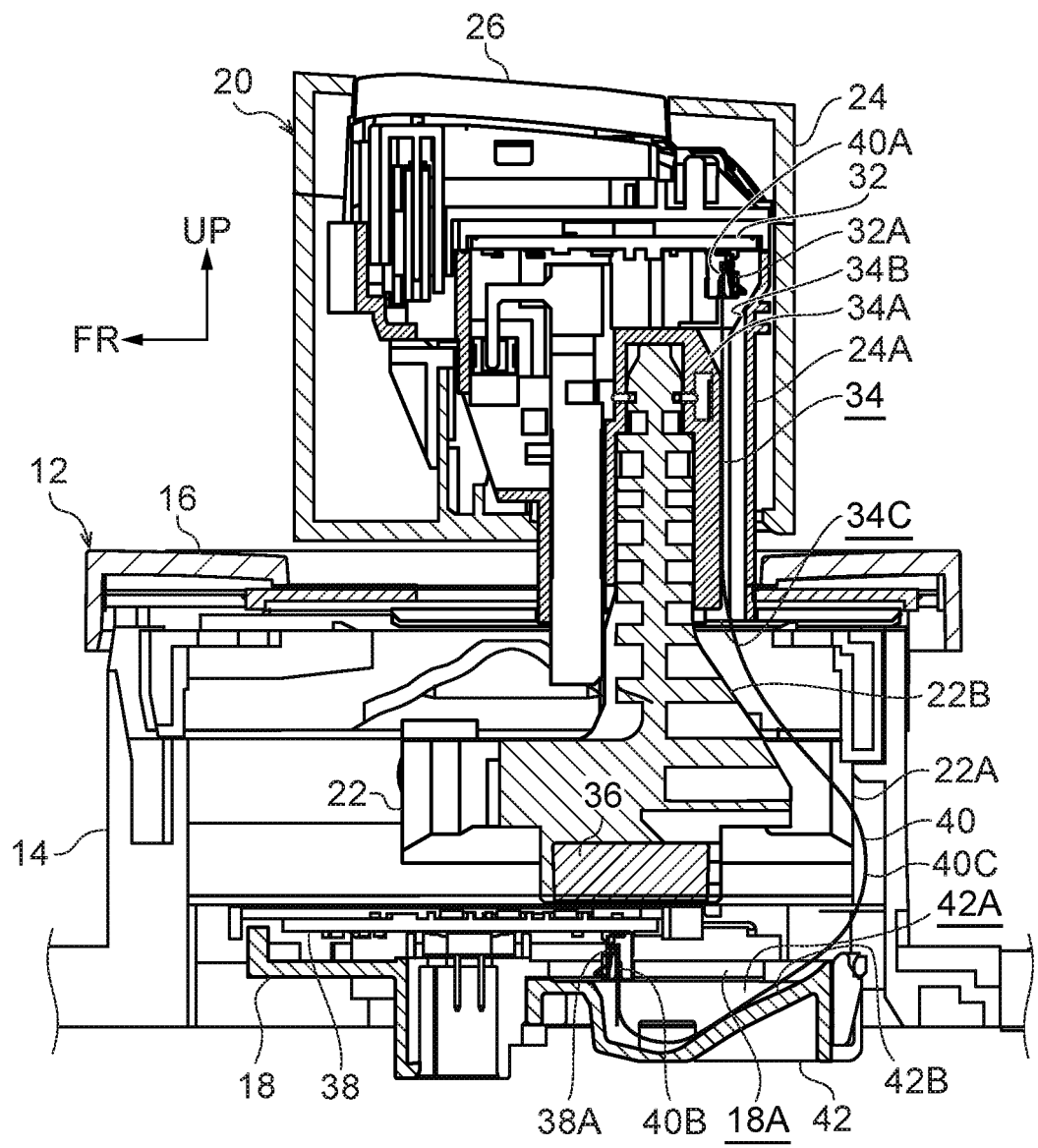
FIG. 5 is a cross-sectional view looking from the left side showing a state when the lever is moved slidingly from 'N' to 'D' in the shift device according to the exemplary embodiment of the present invention.

An intermediate portion in the up-down direction of the lever 20 is inserted through an upper wall of the housing gate 16 of the housing 20 so as to be able to move slidingly in the front-rear direction. The lever 20 extends onto the upper side of the housing gate 16 so that the knob 24 is disposed inside the vehicle cabin. The knob 24 can accordingly be gripped by a vehicle occupant (particularly by the driver), and the shift position of the lever 20 is altered when the lever 20 is moved slidingly in the front-rear direction as a result of the knob 24 being gripped by the vehicle occupant and operated in the front-rear direction. For example, the lever 20 is placed in an 'N' position (neutral position) which serves as a shift position. The lever 20 may then be moved slidingly forwards from the 'N' position so as to be placed in an 'R' position (reverse position; a front end position within the predetermined range) which also serves as a shift position (see FIG. 4), and may also be moved slidingly backwards from the 'N' position so as to be placed in a 'D' position (drive position; a rear end position within the predetermined range) which also serves as a shift position (see FIG. 5).

An indicator panel 26 which serves as a display portion is provided in an upper end of the knob 24, and a shift display 26A is formed in a left-side portion (or in a right-side portion) of the indicator panel 26. A P-switch 28 which serves as an operating portion is provided in the right-side portion (or in the left-side portion) of the indicator panel 26, and this P-switch 28 is able to be operated (i.e., depressed) by the vehicle occupant. A button 30 which serves as a lock release portion is provided on a left end (or on a right end) of the knob 24, and this button 30 is able to be operated (i.e., depressed) by the vehicle occupant.

A substantially planar operating substrate 32 (i.e., a circuit substrate) which serves as a second electrical mechanism is fixed to the knob 24 interior. The operating substrate 32 is fixed to an upper side of the knob body 24A, and is disposed so as to be perpendicular to the up-down direction. The operating substrate 32 is disposed on the lower side of the indicator panel 26 and the P-switch 28 and on the right side of the button 30. The operating substrate 32 enables the shift display 26A of the indicator panel 26 and the P-switch 28 to be illuminated, and enables operations of the P-switch 28 and the button 30 to be detected. An operating connector 32A which serves as a second connecting portion is provided at a rear end portion of a lower surface of the operating substrate 32, so that an upper side of the operating connector 32A is covered by the operating substrate 32.

An insertion through hole 34 having a rectangular cross-section is formed in a rear end portion of the knob body 24A, and this insertion through hole 24 extends in the up-down direction. The dimension in the front-rear direction of the insertion through hole 34 is made smaller (i.e., the minimum dimension in the front-rear direction is set, for example, to 1 mm), while the dimension in the left-right direction of the insertion through hole 34 is made larger. The insertion through hole 34 is open on the upper side thereof, and an upper portion of the insertion through hole 34 faces towards the operating connector 32A of the operating substrate 32 in the up-down direction. A front insertion surface 34A is formed on a front surface of an upper portion of the insertion through hole 34, and this front insertion surface 34A is inclined so as to slope upwards as it approaches the forward side thereof. A rear insertion surface 34B is formed on a rear surface of the upper portion of the insertion through hole 34, and this rear insertion surface 34B is inclined so as to slope upwards as it approaches the rearward side thereof. The front insertion surface 34A and the rear insertion surface 34B cause the upper portion of the insertion through hole 34 to be enlarged in the front-rear direction, and an upper end of the front insertion surface 34A is disposed slightly on the upper side of a lower end of the rear insertion surface 34B, while the upper portion of the insertion through hole 34 is open towards the front on the upper side of the front insertion surface 34A. A lower end portion of the insertion through hole 34 forms a discharge aperture 34C, and opens into the interior of the housing 12. The lower end portion of the insertion through hole 34 opens downwards via the discharge aperture 34C, and accordingly faces the mounting surface 22B of the lever main body 22 in the up-down direction. The discharge aperture 34C is open towards the front side, and the lower end portion of the insertion through hole 34 opens towards the front side via the discharge aperture 34C.

A rectangular-parallelepiped shaped magnet 36 which serves as a detected portion is fixed via insert molding to the lower end portion of the lever main body 22. The magnet 36 is exposed towards the lower side of the lever main body 22, and moves slidingly in the front-rear direction integrally with the lever main body 22.

A substantially planar sensor substrate 38 (i.e., a circuit substrate) which serves as a first electrical mechanism is fixed to an upper side of the sensor case 18 of the housing 12, and this sensor substrate 38 is disposed so as to be perpendicular to the up-down direction. The sensor substrate 38 faces the magnet 36 of the lever main body 22 in the up-down direction, and the shift position of the lever 20 is detected as a result of the position in the front-rear direction of the lever 20 being detected via the sensor substrate 38 detecting a magnetic field generated by the magnet 36 and thereby detecting the position in the front-rear direction of the magnet 36. A sensor connector 38A which serves as a first connecting portion is provided in a rear end portion of the lower surface of the sensor substrate 38 so that an upper side of the sensor connector 38A is covered by the sensor substrate 38. In addition, when the lever 20 is placed in the 'D' position, a lower end of the mounting surface 22B of the lever main body 22 is disposed on the rear side of the sensor substrate 38 (see FIG. 5).

An elongated, thin rectangular-board shaped FFC (Flexible Flat Cable) 40 which serves as a connecting board extends between the operating connector 32A of the operating substrate 32 and the sensor connector 38A of the sensor substrate 38. This FFC 40 electrically connects the operating substrate 32 to the sensor substrate 38. A thickness dimension of the FFC 40 is preferably 1 mm or less, and is normally set to 0.05 mm or less. The FFC 40 is flexible and is capable of being elastically deformed principally in the longitudinal direction (i.e., in the extension direction) thereof. A width direction (i.e., an extension width direction) of the FFC 40 is disposed in parallel with the left-right direction over the entire longitudinal direction of the FFC 40, and the lever 20 is moved slidingly in the front-rear direction, which is a perpendicular direction side (this should be 45° or greater and is normally set to 85° or greater) relative to the width direction of the FFC 40.

A one-side end portion (i.e., an upper-side end portion) of the FFC 40 forms a one-side terminal portion 40A which serves as a second terminal portion and is connected to the operating connector 32A of the operating substrate 32 from the underside thereof. A one-side portion of the FFC 40 is inserted through the insertion through hole 34 in the knob body 24A. This one-side portion of the FFC 40 is formed in a planar shape, and is disposed so as to be perpendicular to the front-rear direction. The one-side portion of the FFC 40 is in surface contact with the front surface of the insertion through hole 34 excluding the upper portion and the lower end portion thereof. Additionally, the FFC 40 is discharged from a discharge aperture 34C of the insertion through hole 34 into the (lower-side) interior of the housing 12.

An other-side end portion (i.e., a lower-side end portion) of the FFC 40 forms an other-side terminal portion 40B which serves as a first terminal portion and is connected to the sensor connector 38A of the sensor substrate 38 from the underside thereof. A portion of the FFC 40 from the discharge aperture 34C of the insertion through hole 34 to one side of the other-side terminal portion 40B forms a curved portion 40C, and a longitudinal direction thereof is curved so as to protrude towards the rear side. A one-side end (i.e., an upper-side end) of this curved portion 40C of the FFC 40 abuts against a lower end of the rear surface of the discharge aperture 34C, and the curved portion 40C is disposed on the rear side of the mounting surface 22B of the lever main body 22 and the sensor substrate 38. The curved portion 40C of the FFC 40 is inserted between the rear portions of the pair of slides 22A in the lever main body 22.

A substantially block-shaped guide 42 which is made of resin and serves as a contact body is fixed to the sensor case 18 of the housing 12 from the underside thereof. This guide 42 is disposed on the lower side and rear side of the sensor substrate 38. A guide hole 42A having a substantially inverted-trapezoid shaped cross-section is formed in the guide 42, and the guide hole 42A opens inside the housing 12 (on the upper side thereof) via the open hole 18A in the sensor case 18 at a position in the front-rear direction on the rear side of the sensor substrate 38 from the sensor connector 38A of the sensor substrate 38. A rear-side surface of the guide hole 42A forms a guide surface 42B which serves as a contact portion, and this guide surface 42B is inclined so as to slope upwards as it approaches the rearward side, and is also curved so as to protrude slightly towards the upper side.

The curved portion 40C of the FFC 40 is inserted into the guide hole 42A, and the curved portion 40C is placed in contact with the guide surface 42B so that the curvature of the curved portion 40C is reduced. The contact pressure (i.e., the elastic contact force) with which the curved portion 40C is pressed against the guide surface 42B is increased so that, as a result of this, a sliding motion across the guide surface 42B by the contact portion of the curved portion 40C which is in contact with the guide surface 42B is restricted.

When the lever 20 is moved slidingly towards the front from the 'D' position to the 'R' position (see FIG. 3 through FIG. 5), the one-side end of the curved portion 40C of the FFC 40 is moved slidingly towards the front while maintaining a state of abutting against the lower end of the rear surface of the discharge aperture 34C of the knob body 24A. Furthermore, the curved surface 40C is moved towards the rear side away from the mounting surface 22B of the lever main body 22, and is then withdrawn towards the rear side from between the rear portions of the pair of slides 22A of the lever main body 22. Moreover, as a result of the contact portion of the curved portion 40C which is in contact with the guide surface 42B of the guide 42 being moved towards the front side from the one-side portion (i.e., the rear-side portion) thereof, the surface area of the contact between the curved portion 40C and the guide surface 42B is decreased, and the curved portion 40C is moved close to the sensor substrate 38. In addition, at the same time as the contact pressure with which the curved surface 40C is in contact with the guide surface 42B is maintained at a high level, the sliding motion across the guide surface 42B by the contact portion of the curved portion 40C which is in contact with the guide surface 42B is restricted.

When the lever 20 is moved slidingly towards the rear from the 'R' position to the 'D' position (see FIG. 3 through FIG. 5), the one-side end of the curved portion 40C of the FFC 40 is moved slidingly towards the rear while maintaining a state of abutting against the lower end of the rear surface of the discharge aperture 34C of the knob body 24A. Furthermore, the curved surface 40C is moved towards the mounting surface 22B of the lever main body 22, and is then inserted between the rear portions of the pair of slides 22A of the lever main body 22. Moreover, as a result of the portion of the curved portion 40C that has been moved towards the upper side away from the guide surface 42B of the guide 42 then being moved towards the rear side, the surface area of the contact between the curved portion 40C and the guide surface 42B is increased, and the curved portion 40C is moved towards the rear side away from the sensor substrate 38. In addition, at the same time as the contact pressure with which the curved surface 40C is in contact with the guide surface 42B is maintained at a high level, the sliding motion across the guide surface 42B by the contact portion of the curved portion 40C which is in contact with the guide surface 42B is restricted.

The sensor substrate 38 is electrically connected to a vehicle control device 44, and an automatic transmission 46 of the vehicle is also electrically connected to the control device 44. When the sensor substrate 38 detects a change in the shift position of the lever 20, under predetermined conditions the shift range of the automatic transmission 46 is moved via control performed by the control device 44 to the shift range (i.e., to the 'R' range (i.e., the reverse range), the 'N' range (i.e., the neutral range), or the 'D' position (i.e., the drive range)) that corresponds to the shift position of the shift lever 20. When the operating substrate 32 detects an operation of the P-switch 28 of the indicator panel 26, under predetermined conditions the shift range of the automatic transmission 46 is moved via control performed by the control device 44 to the 'P' range (i.e., the parking range). Moreover, via control performed by the control device 44, the operating substrate 32 causes the display of the shift range of the automatic transmission 46 to be illuminated in the shift display 26A of the indicator panel 26 or in the P-switch 28.

A locking mechanism 48 is electrically connected to the control device 44. The locking mechanism 48 locks a predetermined sliding motion of the lever 20 in the front-rear direction, and locks a predetermined change in the shift position of the lever 20. When the operating substrate 32 detects an operation of the button 30 of the knob 24, the locking mechanism 48 releases the locking of (i.e., permits) the predetermined sliding motion of the lever 20 in the front-rear direction via control performed by the control device 44, and releases the locking of (i.e., permits) the predetermined change in the shift position of the lever 20.

Next, actions of the present exemplary embodiment will be described.

In the shift device 10 having the above-described structure, the lever 20 is able to move slidingly in a front-rear direction relative to the housing 12, and the FFC 40 electrically connects the sensor substrate 38 of the housing 12 to the operating substrate 32 of the lever 20 (i.e., the knob 24).

Here, the lever 20 is moved slidingly in the front-rear direction, which is a perpendicular direction side relative to the width direction of the FFC 40. Because of this, when the lever 20 is moved slidingly in the front-rear direction, it is possible to inhibit the one-side portion (i.e., the operating substrate 32-side portion) of the FFC 40 from sliding in the front-rear direction relative to the other-side portion (i.e., the sensor substrate 38-side portion) of the FFC 40 when the FFC 40 is twisted around the longitudinal direction thereof, so that any reduction in the durability of the FFC 40 can be inhibited. Furthermore, the operating substrate 32 and the sensor substrate 38 can be connected together solely by the FFC 40 without a harness needing to be used, so that the number of parts can be decreased, and costs can consequently be reduced.

In addition, the one-side terminal portion 40A of the FFC 40 is connected to the operating connector 32A on the lower surface of the operating substrate 32 from the underside thereof, and the other-side terminal portion 40B of the FFC 40 is connected to the sensor connector 38A on the lower surface of the sensor substrate 38 from the underside thereof. Because of this, it is possible to prevent a liquid (for example, water) from penetrating between the operating connector 32A and the one-side terminal portion 40A and between the sensor connector 38A and the other-side terminal portion 40B.

Furthermore, the insertion through hole 34 of the lever 20 (i.e., the knob body 24A) extends in an up-down direction, and the one-side portion of the FFC 40 is inserted through the insertion through hole 34. Because of this, when the lever 20 is moved slidingly in the front-rear direction, the movement of the one-side portion of the FFC 40 relative to the lever 20 (i.e., to the knob body 24A) can be inhibited so that any consequent reduction in the durability of the one-side portion of the FFC 40 can be effectively inhibited, and a connection can be effectively maintained between the one-side terminal portion 40A of the FFC 40 and the operating connector 32A.

Moreover, the curved portion 40C on the other side of the FFC 40 is in contact with the guide surface 42B of the guide 42, and the curvature of the curved portion 40C is made smaller. Because of this, when the lever 20 is moved slidingly in the front-rear direction (i.e., when the one-side portion of the FFC 40 is moved slidingly in the front-rear direction relative to the curved portion 40C of the FFC 40), the curvature of the curved portion 40C can be inhibited from becoming excessively large, and any reduction in the durability of the curved portion 40C of the FFC 40 can be effectively inhibited.

Furthermore, when the lever 20 is moved slidingly in the front-rear direction, the sliding motion across the guide surface 42B by the contact portion of the curved portion 40C which is in contact with the guide surface 42B is restricted. Because of this, it is possible to restrict movement force from the curved portion 40C from acting on the other-side terminal portion 40B of the FFC 40, and to effectively maintain a connection between the other-side terminal portion 40B and the sensor connector 38A.

Moreover, when the shift device 10 is being assembled, when the FFC 40 is inserted from the other-side terminal portion 40B thereof through the insertion through hole 34 in the lever 20, the insertion of the other-side terminal portion 40B into the insertion through hole 34 is guided by the front insertion surface 34A and the rear insertion surface 34B in the upper portion of the insertion through hole 34. Because of this, the FFC 40 can be easily inserted through the insertion through hole 34, so that the shift device 10 can be easily assembled.

Figure 6:
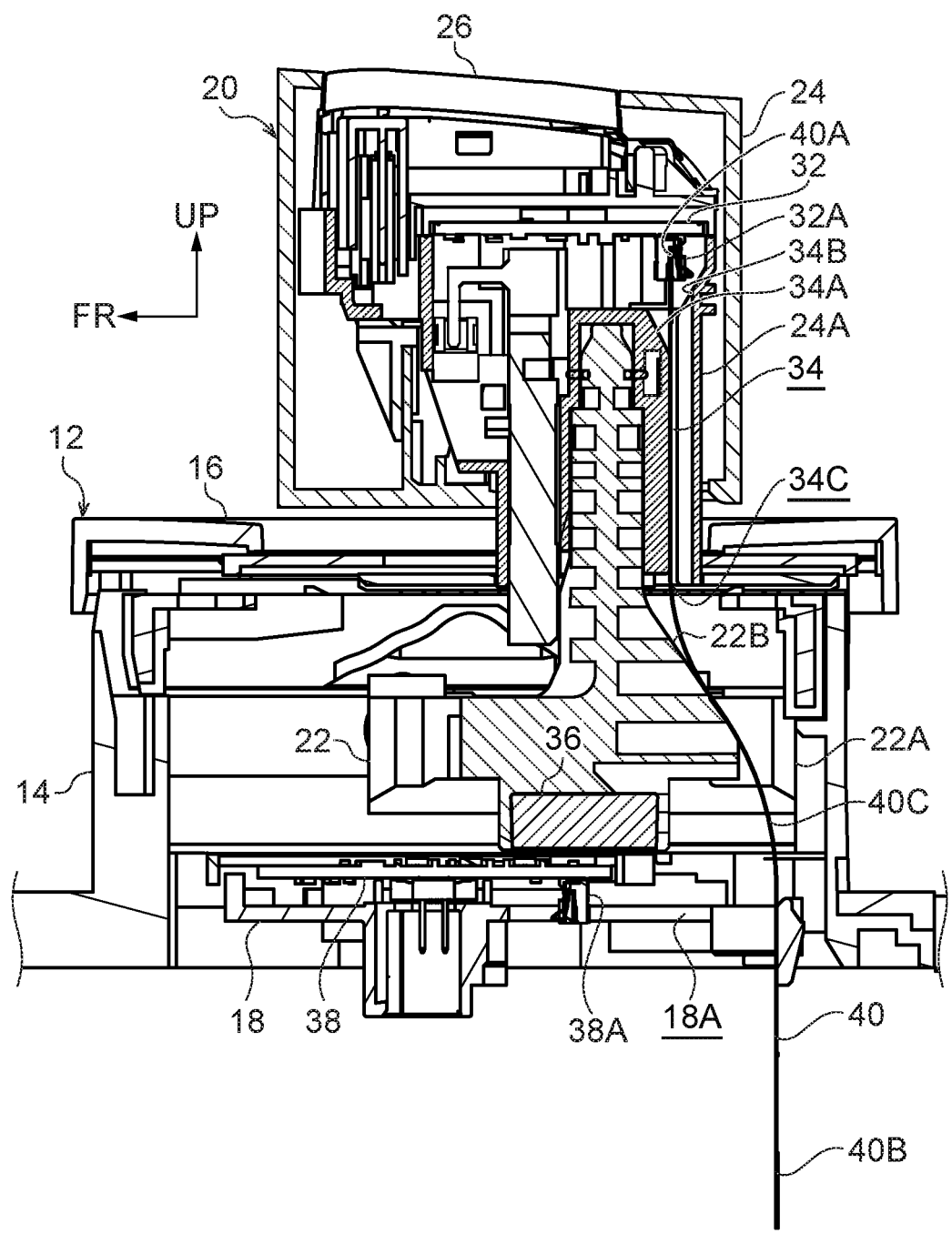
FIG. 6 is a cross-sectional view looking from the left side showing a state when the shift device according to the exemplary embodiment of the present invention is assembled.

Furthermore, when the shift device 10 is being assembled, as a result of the one-side terminal portion 40A of the FFC 40 being connected to the operating connector 32A of the operating substrate 32, and the one-side portion of the FFC 40 being inserted through the insertion through hole 34 in the lever 20, the other-side portion of the FFC 40 is discharged into the housing 12 interior from the discharge aperture 34C (see FIG. 6). Because of this, the other-side terminal portion 40B of the FFC 40 can be easily connected to the sensor connector 38A of the sensor substrate 38, thereby enabling the shift device 10 to be assembled even more easily.

Moreover, when the shift device 10 is being assembled, prior to the guide 42 being fixed to the sensor case 18 of the housing 12, after the lever 20 has been placed in the rear-side (i.e., one side in the predetermined direction; a sensor connector 38A side in the sensor substrate 38) 'D' position, the other-side portion of the FFC 40 is discharged from the discharge aperture 34C in the rear portion of the lever 20, and is guided by (i.e., is in contact with) the mounting surface 22B of the lever 20 (see FIG. 6). Because of this, the other-side portion of the FFC 40 can be extended further onto the lower side via the open hole 18A in the sensor case 18 on the rear side of the mounting surface 22B and the sensor substrate 38, so that the other-side terminal portion 40B of the FFC 40 can be easily connected to the sensor connector 38A at the rear portion of the sensor substrate 38, and the shift device 10 can be assembled even more easily.

Furthermore, when the shift device 10 is being assembled, after the other-side terminal portion 40B of the FFC 40 has been connected to the sensor connector 38A of the sensor substrate 38, the curved portion 40C of the FFC 40 is placed in contact with the guide surface 42B of the guide 42 as a result of the guide 42 being fixed to the sensor case 18 from the underside thereof. Because of this, the curved portion 40C can be easily placed in contact with the guide surface 42B, and the shift device 10 can be assembled even more easily.

Note that in the present exemplary embodiment, the connecting board is formed by the FFC 40. However, it is also possible for the connecting board to be formed instead by an FPC (Flexible Printed Circuit)

Furthermore, in the present exemplary embodiment, the lever 20 is able to move slidingly in the front-rear direction (i.e. in a predetermined direction). However, it is also possible for the lever 20 to be able to pivot in a predetermined direction.

Moreover, in the present exemplary embodiment, the shift device 10 is a floor-mounted shift device that is installed on the floor portion of a vehicle cabin. However, the shift device 10 may instead be installed in a console, instrument panel, or steering column of a vehicle cabin.

An exemplary embodiment of the present disclosure has been described above, however, the present disclosure is not limited to this. Various modifications and the like may be made to the present disclosure insofar as they do not depart from the spirit or scope of the present disclosure.

What is claimed is:

1. A shift device comprising:
    a first electrical mechanism which is provided at a vehicle body side;
    a shift body that is movable via a sliding or pivoting motion in a predetermined direction relative to the first electrical mechanism and that, as a result of being moved, causes a shift position to be altered;
    a second electrical mechanism which is provided at the shift body; and
    a connecting board that is flexible, and that extends between the first electrical mechanism and the second electrical mechanism so as to electrically connect the first electrical mechanism and the second electrical mechanism together, the shift body moving only towards a perpendicular direction side relative to a width direction of the connecting board.

2. The shift device according to claim 1, wherein the connecting board is connected to at least one of the first electrical mechanism or the second electrical mechanism from an underside thereof.

3. The shift device according to claim 1, wherein a discharge aperture is provided at the shift body through which the connecting board is discharged from a bottom end of the shifter toward the first electrical mechanism.

4. The shift device according to claim 1, further comprising a contact portion that is contacted by the connecting board when the connecting board is bent, and that causes a curvature of the connecting board to be reduced.

5. The shift device according to claim 4, wherein, when the shift body is moved, a sliding motion of the connecting board relative to the contact portion is restricted.

6. The shift device according to claim 4, wherein, when the shift body is moved, a surface area of contact between the connecting board and the contact portion is changed.

7. The shift device according to claim 4, wherein a contact body that is assembled from an opposite side from the connecting board is provided with the contact portion.

8. The shift device according to claim 1, wherein an insertion through hole is provided at the shift body through which the connecting board is inserted so as to extend along the shift body from the second electrical mechanism in a direction toward the first electrical mechanism.

9. The shift device according to claim 8, wherein an end portion in an extension direction of the insertion through hole is enlarged.

10. The shift device according to claim 1, wherein the connecting board is disposed at a portion on one side in the predetermined direction of the shift body, and the shift body is moved to the one side in the predetermined direction so as to be moved to a side of a connecting portion between the first electrical mechanism and the connecting board.

* * * * *